: United States Patent (10) Patent No.: US 7,733,871 B2
Choi et al. (45) Date of Patent: Jun. 8, 2010

(54) QOS CONTROL APPARATUS IN MULTI-CELL NETWORK SYSTEM AND METHOD THEREOF

(75) Inventors: Sung-gu Choi, Daejeon (KR);
Soo-Chang Kim, Daejeon (KR); Ji-Soo Park, Daejeon (KR); Seung-Kwon Baek, Daejeon (KR); Won-Ik Kim, Daejeon (KR); Yeon-Seung Shin, Daejeon (KR); Yeong-Jin Kim, Daejeon (KR)

(73) Assignees: Electronics and Telecommunications Research Institute, Daejeon (KR); SK Telecom Co., Ltd., Seoul (KR); KT Corporation, Seongnam (KR)

( * ) Notice: Subject to any disclaimer, the term of this patent is extended or adjusted under 35 U.S.C. 154(b) by 728 days.

(21) Appl. No.: 11/525,099

(22) Filed: Sep. 22, 2006

(65) Prior Publication Data

US 2007/0133401 A1 Jun. 14, 2007

(30) Foreign Application Priority Data

Dec. 8, 2005 (KR) ...................... 10-2005-0119989
May 4, 2006 (KR) ...................... 10-2006-0040363

(51) Int. Cl.
*H04W 36/14* (2009.01)
(52) U.S. Cl. .............................. 370/395.21; 455/435.1; 455/435.2
(58) Field of Classification Search ............ 370/395.21, 370/395.3, 395.31, 395.32, 328, 331–334; 455/435.1, 435.2
See application file for complete search history.

(56) References Cited

U.S. PATENT DOCUMENTS 5,581,544 A * 12/1996 Hamada et al. ............. 370/253
7,088,724 B2 * 8/2006 Yamanaka ............. 370/395.52
2003/0074443 A1 4/2003 Melaku et al.
2004/0102195 A1 * 5/2004 Naghian et al. .......... 455/456.1

FOREIGN PATENT DOCUMENTS

| EP | 1418782 | 5/2004 |
| GB | 2398705 | 8/2004 |
| KR | 1020000027072 | 5/2000 |
| LR | 1020020054559 | 7/2002 |
| WO | WO 98/29975 | 7/1998 |
| WO | WO 99/51052 | 10/1999 |

* cited by examiner

*Primary Examiner*—Dang T Ton
*Assistant Examiner*—Kevin Lee
(74) *Attorney, Agent, or Firm*—Lowe Hauptman Ham & Berner LLP

(57) ABSTRACT

In a QoS information controller and method, the QoS information controller is used in a multi-cell environment to determine the traffic characteristic, the mobile communication system characteristic, the traffic processing capacity, and the radio resource, and to control the QoS information. In addition, a QoS requested by a user may be achieved since the traffic characteristic, the mobile communication system characteristic, the traffic processing capacity, and the radio resource are determined and the QoS information is controlled to efficiently process the QoS information for the multimedia traffic in the multi-cell environment.

6 Claims, 3 Drawing Sheets

↷ Handover between ASs
⌒ Handover between sectors
⌢ Handover between ANs

QOS CONTROL APPARATUS IN MULTI-CELL NETWORK SYSTEM AND METHOD THEREOF

CROSS-REFERENCE TO RELATED APPLICATION

This application claims priority to and the benefit of Korean Patent Application Nos. 10-2005-0119989 filed on Dec. 08, 2005 and 10-2006-0040363 filed on May 04, 2006 in the Korean Intellectual Property Office, the entire contents of which are incorporated herein by reference.

BACKGROUND OF THE INVENTION (a) Field of the Invention

The present invention relates to a quality of service (QoS) information control apparatus in a multi-cell environment and a method thereof. More particularly, the present invention relates to an apparatus for improving a communication QoS in a mobile communication system and a method thereof.

(b) Description of the Related Art

A conventional mobile communication system provides low speed data services based on voice services. However, multimedia services, such as real-time traffic including data and images, and non-real-time traffic including data transmission, web servers, and e-mails, are the main streams in a next generation mobile communication system.

Accordingly, quality of service (QoS) information including a packet process, a transmission delay, accuracy, and reliability is important in the mobile communication system providing the multimedia services.

In a conventional single network system environment, there are a method for providing the set QoS information and a method for providing the QoS information according to a service priority determined according to a communication state including traffic of the mobile communication system.

In the next generation mobile communication system, an overlapped multi-cell environment will be realized, and a user receives the QoS information on various services according to user preferences and characteristics of the system.

However, in a multi-cell system providing various kinds of traffic, interference caused by neighboring cells occurs since a cell environment is quite complicated, and therefore it is required to design the cell environment without the interference.

In addition, signaling overhead is generated since an unnecessary handover is generated by independently receiving a signal in the multi-cell system, and the communication system is deteriorated.

In general, the communication system is affected very little by a packet loss in transmitting voice information packets, but it may be seriously affected by a packet loss in transmitting a data service.

Accordingly, it is required to retransmit files to compensate an error in the data service since no error is allowed in transmitting the files, which deteriorates a data rate, and the error may not be corrected.

Differing from the single network system, in the multi-cell environment system, when the QoS information of a multimedia service having various characteristics is not managed according to service characteristics in a system, the QoS information requested by the user may not be provided.

Accordingly, when a system for guaranteeing the QoS information is selected and a method for receiving the QoS by accessing a cell of the nearest communication system used in the communication is used, the user may not receive the desired QoS information.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a quality of service (QoS) information apparatus for improving a QoS by controlling QoS information of multimedia traffic in a multi-cell environment, and a method thereof.

An exemplary QoS information controller for controlling the QoS information to improve a communication QoS according to an embodiment of the present invention includes a controller, a system determining unit, a traffic processor, and a readjusting unit. The controller detects characteristics of a mobile communication system in an area range that guarantees the QoS information, and generates weight information for selecting the mobile communication system guaranteeing requested QoS information. The system determining unit determines the mobile communication system guaranteeing the requested QoS information by using the generated weight information. The traffic processor processes a traffic service for each traffic characteristic when the mobile communication system guaranteeing the requested QoS information is determined by the system determining unit. The readjusting unit uses the generated weight information, generates a readjust request message including a system parameter guaranteeing the requested QoS information, and transmits the generated message to the controller when the mobile communication system is not determined by the system determining unit.

In an exemplary quality of service (QoS) information control method for controlling QoS information and improving a communication QoS according to an embodiment of the present invention, a) an area range that guarantees the QoS information is detected and it is determined whether there is a mobile communication system for processing the QoS information when receiving a traffic service request signal, b) characteristics of the mobile communication system are detected and the mobile communication system guaranteeing requested QoS information is determined when determining in a) that there is a mobile communication system, and c) a traffic service is processed according to multimedia traffic characteristics when determining the mobile communication system guaranteeing the requested QoS information.

DETAILED DESCRIPTION OF THE EMBODIMENTS

Figure 1:
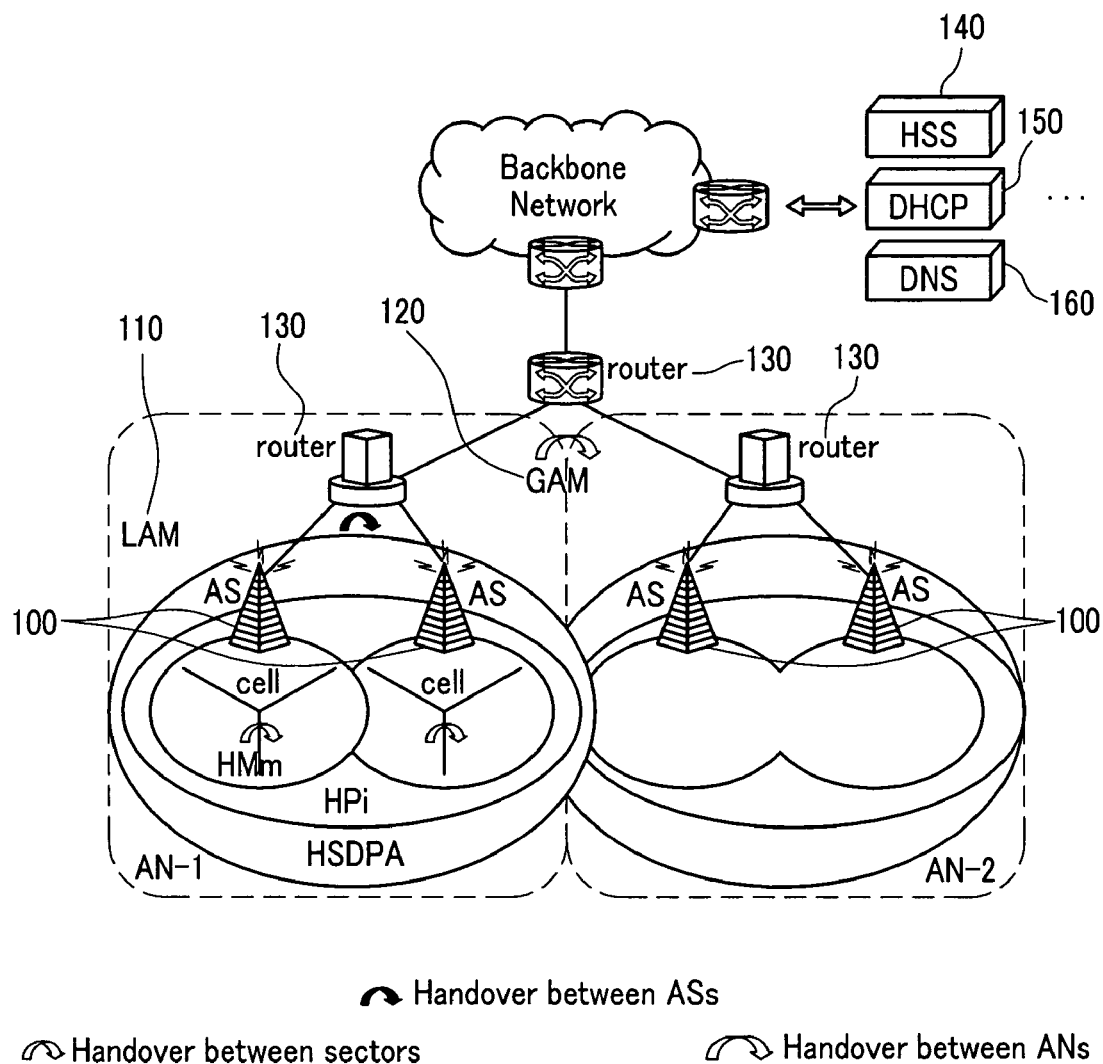
FIG. 1 shows a schematic diagram representing a mobile communication system in a multi-cell environment according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element.

A quality of service (QoS) information controller according to an exemplary embodiment of the present invention in a multi-cell environment and a method thereof will now be described with reference to figures.

FIG. 1 shows a schematic diagram representing a mobile communication system in a multi-cell environment according to an exemplary embodiment of the present invention.

An access station (AS) 100 performs signal and traffic control functions, and a message control function for setting/canceling a service provided between a terminal and an Internet core network.

The AS 100 controls resource allocation, cancellation, and authentication functions for each AS 100.

A local access manager (LAM) 110 performs a function of an Internet multimedia server for performing a core network authentication function and a session and resource management function. The core network, which is a backbone network of large networks for providing large capacity and a long distance voice and data service, includes a public switched telephone network, an integrated services digital network, a wide area network, and a cable television network.

In general, the mobile communication system includes a terminal and an access network, and the core network is accessed to the access network.

The Internet multimedia server located in the core network provides content information including multimedia services, through the Internet.

A local access manager 110 includes a distributed architecture to share the functions of the access station 100, and provides an efficient processing method that is appropriate for a high-speed mobile multimedia configuration.

In addition, the access station 100 transmits backward data from the terminal to the Internet network and the core network through a router 130, and it transmits forward data from the Internet network and the core network to the terminal.

In the mobile communication system, since it is required to set sessions by the Internet multimedia server when all the functions are provided within the core network, loads for processing messages occur and performance may be deteriorated.

In a hierarchical distributed architecture according to the exemplary embodiment of the present invention, the local access manager 110 performs authentication and encoding functions.

The local access manager 110 may perform the authentication function in all session setting processes, but an authentication center of the core network performs the authentication function when a handover is generated between systems having different subnets.

In the hierarchical distributed architecture, a signaling overhead of the communication system may be reduced, and a session control time may be reduced.

The local access manager 110 managing resources of the access stations 100 in the same subnet is a subsystem for managing an operational state of the access station 100 and performing a maintenance and repair operation in the same subnet.

In addition, the local access manager 110 transmits information on an initialization process when the communication system is started, and information on a system formation, to each subsystem through the access station 100, collects state information transmitted from each subsystem, searches the collected state information, and performs diagnosis functions.

A global access manager (GAM) 120 manages resources of the access stations 100 in different subnets is a subsystem for managing an operational state of the access station 100, and performs a maintenance and repair operation in different subnets.

The global access manager 120 transmits information on subnet system initialization and information on system formation, to each subsystem through the router 130, collects state information from each subsystem, and performs diagnosis functions.

When a handover is generated between different subnet routers 130 in the Internet network, the global access manager 120 manages the Internet protocol of the terminal and the access station 100, guarantees mobility, performs the handover by using the mobile Internet protocol (Mobile IP), and performs a function of a conventional home agent.

In addition, the global access manager 120 performs an authorization function and an accounting function in addition to an authentication function.

The router 130 of one subnet unit performs an interworking operation with the local access manager 110, manages Internet protocol (IP) of terminals in the same subnet, and guarantees the mobility.

A home subscriber system (HSS) 140 manages a profile of a subscriber.

A dynamic host configuration protocol (DHCP) 150 dynamically generates, allocates, and cancels the Internet protocol.

A domain name system 160 changes a domain name into an address.

A QoS information control method according to the exemplary embodiment of the present invention is used to efficiently control traffic generated between access stations 100 of the same subnet and between different subnet routers 130, to share limited radio resources and to guarantee communication quality of a traffic service.

A QoS information controller of the access station 100 for guaranteeing the service communication quality according to the exemplary embodiment of the present invention will now be described with reference to FIG. 2.

Figure 2:
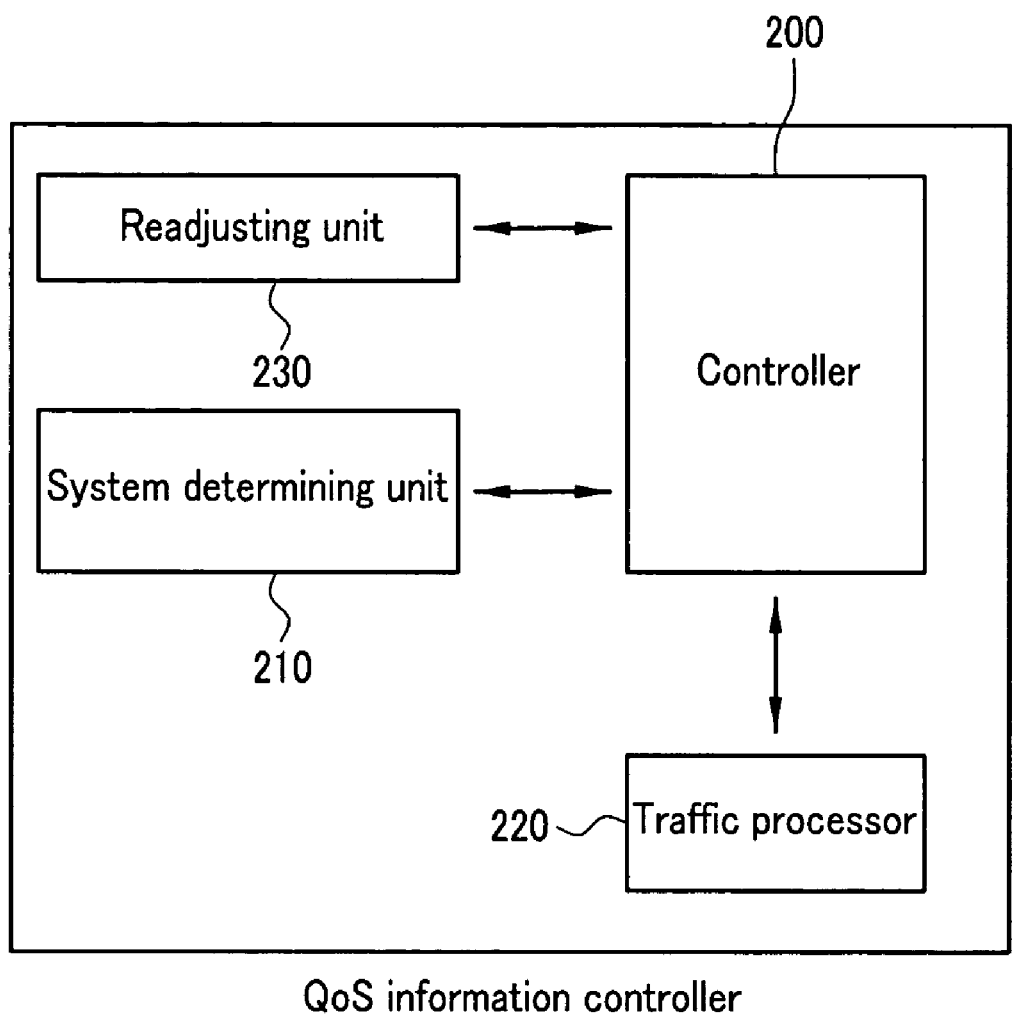
FIG. 2 shows a block diagram of an internal configuration of a QoS information controller formed in an access station according to the exemplary embodiment of the present invention.

FIG. 2 shows a block diagram of an internal configuration of the QoS information controller formed in the access station 100 according to the exemplary embodiment of the present invention.

The QoS information controller according to the exemplary embodiment of the present invention includes a controller 200, a system determining unit 210, a traffic processor 220, and readjusting unit 230.

The controller 200 detects an area range for guaranteeing the QoS information and determines whether there is a mobile communication system for processing the required QoS information.

In addition, the controller 200 detects traffic service characteristics and communication system characteristics including traffic processing capacity, a radio resource usage state, and QoS information, and generates weight information for selecting the mobile communication system guaranteeing the QoS.

The weight information is a parameter that is determined according to traffic service characteristics, system QoS information characteristics, the traffic processing capacity, and the radio resource usage state.

The system determining unit 210 uses the weight information generated by the controller 200, determines an optimum mobile communication system for guaranteeing the QoS information requested by a user, generates a system determination information success signal, and transmits the signal to the traffic processor 220.

When receiving the system determination information success signal from the system determining unit 210, the traffic processor 220 processes an appropriate traffic service according to the traffic characteristics (real-time traffic or non real-time traffic).

When determining that the optimum mobile communication system is not determined, the system determining unit 210 generates a system determination information failure signal, and transmits the signal to the readjusting unit 230.

When receiving the system determination information failure signal from the system determining unit 210, the readjusting unit 230 uses the generated weight information, generates a readjust request message including an optimized system parameter for guaranteeing the QoS information requested by the user, and transmits the messages to the controller 200.

When receiving the readjust request message from the readjusting unit 230, the controller 200 uses the optimized system parameter in the readjusting request message, generates readjusted weight information for selecting the mobile communication system guaranteeing the QoS, and transmits the readjusted weight information to the system determining unit 210.

The system determining unit 210 uses the readjusted weight information received from the controller 200, and determines a second mobile communication system for providing second best readjusted QoS information.

The QoS information control method of the access station 100 to guarantee the service communication quality according to the exemplary embodiment of the present invention will now be described with reference to FIG. 3.

Figure 3:
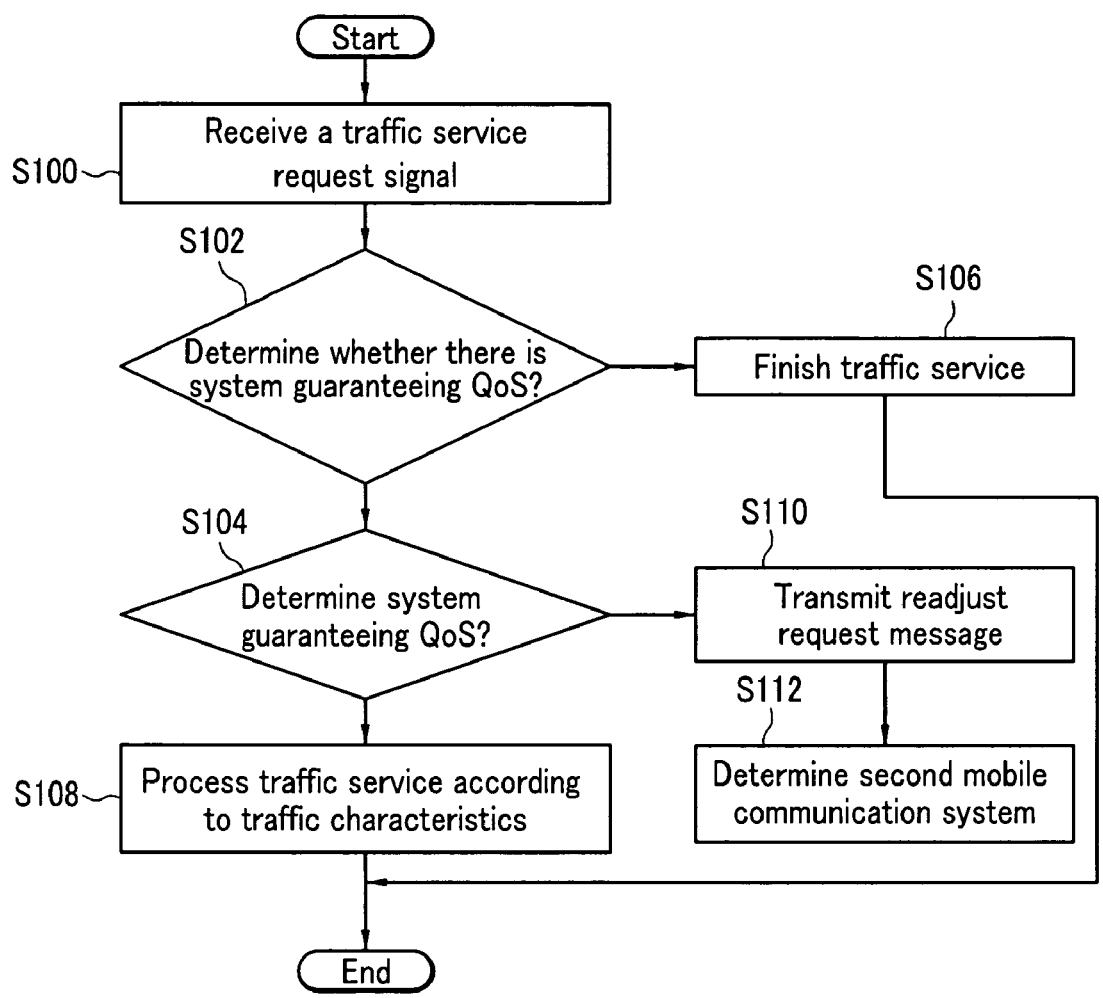
FIG. 3 shows a flowchart representing a QoS information control method according to the exemplary embodiment of the present invention.

FIG. 3 shows a flowchart representing the QoS information control method according to the exemplary embodiment of the present invention.

When receiving a traffic service request signal that requests a traffic process in step S100, the controller 200 of the QoS information controller detects the area range for guaranteeing the requested QoS information, and determines in step S102 whether there is the mobile communication system for processing the requested QoS information.

When determining that there is the mobile communication system for processing the QoS information requested in step S102, the controller 200 of the QoS information controller generates the weight information for detecting the processing capacity of a system in the traffic and the radio resource usage state, and selecting the mobile communication system for guaranteeing the QoS information.

The system determining unit 210 of the QoS information controller receives the generated weight information from the controller 200, and determines the mobile communication system guaranteeing the QoS information requested by the user in step S104.

When determining that there is no mobile communication system processing the QoS information requested in step S102, the system determining unit 210 of the QoS information controller finishes the requested traffic service in step S106.

When determining that the mobile communication system guaranteeing the QoS information requested by the user has been determined in step S104, the traffic processor 220 of the QoS information controller processes a traffic service that is appropriate for the multimedia traffic characteristics (the real-time traffic or the non real-time traffic) in step S108.

When determining that the mobile communication system guaranteeing the QoS information requested by user has not been determined in step S104, the readjusting unit 230 of the QoS information controller generates the readjust request message including an optimized system parameter for guaranteeing the QoS information requested by the user, and transmits the message to the controller 200 in step S110.

When receiving the readjust request message for readjusting the QoS information, the controller 200 of the QoS information controller uses the optimized system parameter in the readjust request message, generates the readjusted weight information for selecting the mobile communication system guaranteeing the QoS, and transmits the readjusted weight information to the system determining unit 210.

The system determining unit 210 of the QoS information controller uses the readjusted weight information received from the controller 200, and determines the second mobile communication system for providing the second best readjusted QoS information in step S112.

That is, the controller 200 performs a readjust algorithm for guaranteeing the second best readjusted QoS information, detects the traffic characteristics, the system characteristics, the processing capacity of the system in the traffic, and the radio resource usage state, and finally determines the mobile communication system for guaranteeing the readjusted QoS information.

The above QoS information control process is repeatedly performed until an optimized system for guaranteeing the readjusted QoS information is determined and the requested QoS information is guaranteed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

In the above configuration, according to the exemplary embodiment of the present invention, the QoS requested by the user may be achieved since the mobile communication system characteristics, the traffic characteristics, and the radio resource usage state are detected to efficiently process the QoS information for the multimedia traffic and the QoS information is controlled in the multi-cell environment.

What is claimed is:

1. A quality of service (QoS) information controller for controlling QoS information to improve a communication QoS, the QoS information controller comprising:
  a controller for detecting characteristics of a mobile communication system in an area range that guarantees the QoS information, and generating weight information for selecting the mobile communication system for guaranteeing requested QoS information;

a system determining unit for determining the mobile communication system for guaranteeing the requested QoS information by using the generated weight information;

a traffic processor for processing a traffic service for each traffic characteristic when the mobile communication system for guaranteeing the requested QoS information is determined by the system determining unit; and a readjusting unit for using the generated weight information, generating a readjusted request message including a system parameter for guaranteeing the requested QoS information, and transmitting the generated message to the controller when the mobile communication system is not determined by the system determining unit.

2. The QoS information controller of claim 1, wherein the characteristics of the mobile communication system comprise at least one selected from the group consisting of a traffic service characteristic, a traffic processing capacity, a radio resource usage state, and a QoS information characteristic.

3. The QoS information controller of claim 1, wherein the controller uses the system parameter in the readjusted request message, generates readjusted weight information for selecting a second mobile communication system guaranteeing the requested QoS information, and transmits the readjusted weight information to the system determining unit when receiving the readjusted request message.

4. The QoS information controller of claim 3, wherein the system determining unit uses the readjusted weight information, and determines the second mobile communication system for providing second best readjusted QoS information.

5. A quality of service (QoS) information control method for controlling QoS information and improving a communication QoS, the QoS information control method comprising:

a) detecting an area range that guarantees requested QoS information and determining whether there is a mobile communication system for processing the requested QoS information, when receiving a traffic service request signal that requests a traffic service process;

b) detecting characteristics of the mobile communication system and determining the mobile communication system for guaranteeing the requested QoS information, when determining in a) that there is the mobile communication system; and c) processing a traffic service according to multimedia traffic characteristics when determining the mobile communication system for guaranteeing the requested QoS information:

b1) generating and transmitting a readjusted request message having a system parameter for guaranteeing the requested QoS information when the mobile communication system for guaranteeing the requested QoS information is not determined;

b2) using the system parameter in the readjusted request message, generating readjusted weight information for selecting a second mobile communication system for guaranteeing the requested QoS information, and transmitting the readjusted weight information; and b3) using the readjusted weight information, and determining the second mobile communication system for providing second best readjusted QoS information.

6. The QoS information control method of claim 5, further comprising:

stopping the traffic service process requested by the traffic service request signal, when determining in a) that there is no mobile communication system for processing the requested QoS information.

* * * * *